(12) United States Patent
Searles

(10) Patent No.: US 6,360,902 B1
(45) Date of Patent: Mar. 26, 2002

(54) FISHING ROD RACK FOR BOAT DECKS

(76) Inventor: David E. Searles, 1090 W. 200 N., Huntington, IN (US) 46750

( * ) Notice: Subject to any disclaimer, the term of this patent is extended or adjusted under 35 U.S.C. 154(b) by 0 days.

(21) Appl. No.: 09/711,572

(22) Filed: Nov. 13, 2000

(51) Int. Cl.[7] ................................................. A47F 7/00
(52) U.S. Cl. ..................................................... 211/70.8
(58) Field of Search .......................... 211/70.8, 68, 67, 211/4, 9; 224/922

(56) References Cited

U.S. PATENT DOCUMENTS

| | | |
|---|---|---|
| 3,376,614 A | 4/1968 | Stahl, Jr. |
| 3,635,433 A | 1/1972 | Anderson |
| 4,479,322 A | 10/1984 | Koppel |
| 4,523,403 A | 6/1985 | Ivy et al. |
| 5,152,494 A | 10/1992 | Frunzar |
| 5,257,700 A | 11/1993 | Wallace |
| 5,487,475 A | 1/1996 | Knee |
| 5,560,138 A | 10/1996 | Dentsbier |
| 5,571,227 A | 11/1996 | Pisarek |
| 5,588,542 A | 12/1996 | Winkler, Jr. et al. |

Primary Examiner—Alvin Chin-Shue
Assistant Examiner—Sarah Purol
(74) Attorney, Agent, or Firm—Paul W. O'Malley; Susan L. Firestone

(57) ABSTRACT

A storage system for fishing poles is discloses. The storage system includes a platform adapted to rest on a boat deck. An upper surface of the platform includes receptacles to receive the butt ends of fishing poles placed in the storage system. A frame extends upwardly from the platform and supports a rectangular member above and vertically oriented with respect to the platform. Notches are formed along and into one edge of the rectangular member, corresponding one to one with receptacles on the upper surface of the platform, with which they are aligned. An arm is pivotally attached with respect to the frame to close and open along the major edge of the rectangular member including the plurality of notches. A lock is provided for securing the arm against the major edge.

8 Claims, 2 Drawing Sheets

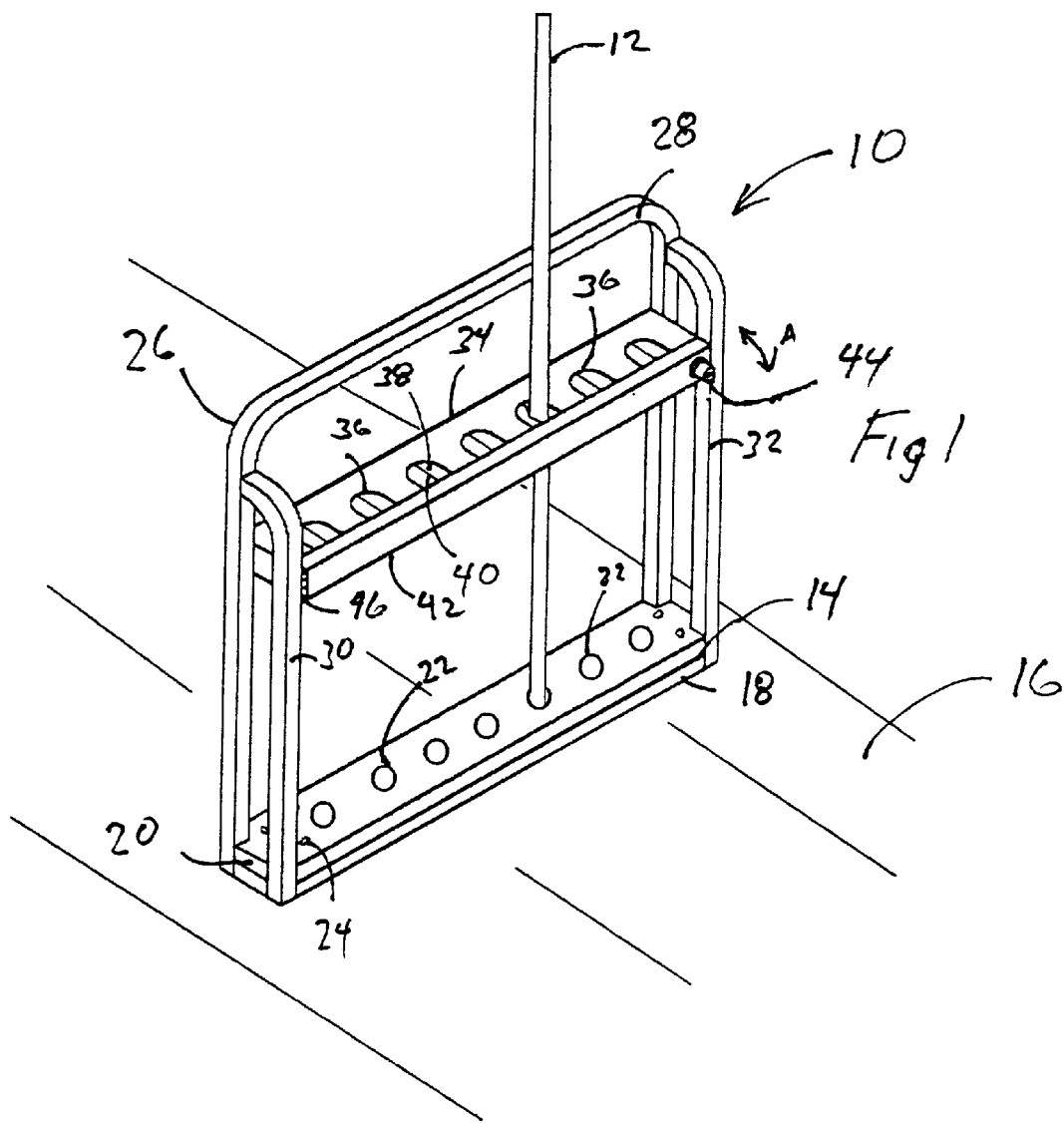
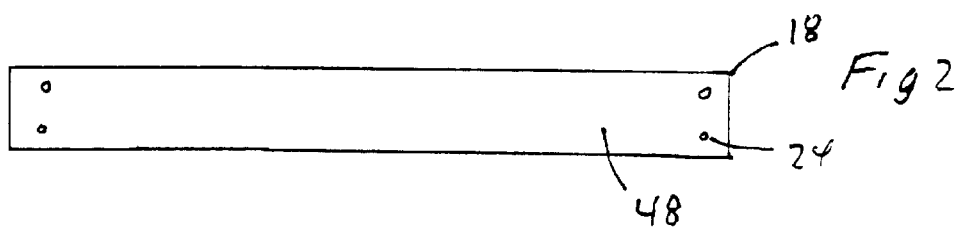

FISHING ROD RACK FOR BOAT DECKS

BACKGROUND OF THE INVENTION

1. Field of the Invention

The present invention relates to on board boat stowage of equipment and more particularly to the secure storage on board boats of fishing gear.

2. Description of the Prior Art

The art teaches numerous fishing rod storage systems. Vertically upright storage of fishing rods appears to exhibit several advantages over horizontal storage. Vertical storage saves floor or shelf space, helps keep poles and equipment organized, advantageously displays the poles for inspection and conveniently positions the poles for retrieval. Vertical storage can also help avoid the tangling of lines and lures that occurs with carelessly stored poles. Easy retrieval and minimal lateral space requirements are particular advantages for use on board a boat. On board storage should also provide for securing poles against easy dislodgement due to rough seas or to the unintended contact with the occupants of the boat. Where the boat is an open boat, a storage system which secures the rods against easy theft is also desirable.

SUMMARY OF THE INVENTION

The invention provides a storage system for narrow elongated articles. The storage system includes a platform adapted to rest on a boat deck. An upper surface of the platform includes receptacles to receive the butt ends of fishing poles placed in the storage system. A frame extends upwardly from the platform and supports a rectangular member above and vertically aligned with the platform. Notches are formed along and into one edge of the rectangular member, corresponding one to one with receptacles on the upper surface of the platform, with which they are aligned. An arm is pivotally attached with respect to the frame to close and open along the major edge of the rectangular member including the plurality of notches. A lock is provided for securing the arm against the major edge.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a perspective view of one embodiment of the fishing rod rack of the present invention.

FIG. 2 is a bottom view of the fishing rod rack.

FIG. 6 is a perspective view of the embodiment of FIG. 1 opened for the placement or withdrawal of fishing rods.

DETAILED DESCRIPTION OF THE INVENTION

Figure 3:
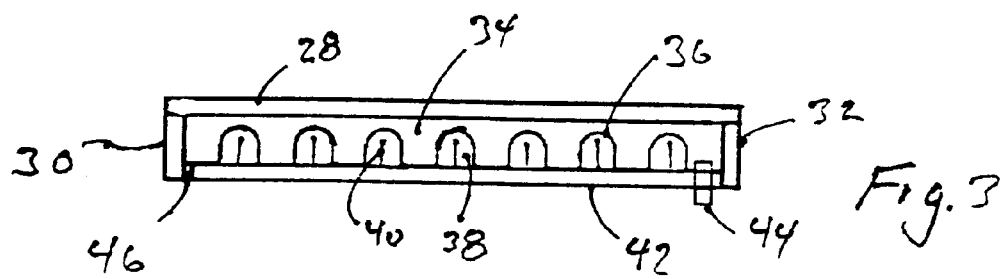
FIG. 3 is a top view of the fishing rod rack.

Referring now to the drawings, first embodiment of a fishing rod storage rack 10 constructed in accordance with the teachings of the present invention is shown. Fishing rod rack 10 provides for storage of fishing poles 12 or other elongated objects, typically on board an open boat. Storage rack 10 includes a base platform 14 at the bottom of the rack for supporting the rack on the deck 16 of a boat. Base platform 14 is preferably of two piece construction, having a substantially rectangular base layer 18 which has a flat major undersurface 48 (shown in FIG. 2) which in turn may rest flush on deck 16. An upper layer 20 may be placed directly on top of base layer 18 or spaced from, but still parallel to, the base layer. Upper layer is also a rectangular member, positioned aligned with base layer 18. Upper layer 20 includes a plurality of openings 22 running through the member from upper to lower major surface. Openings 22 are co-linear and run parallel to the major (elongated) edges of the upper layer 22. Openings 22 provide receptacles for receiving the butt ends of fishing poles or similar elongated rod like members. A set of smaller threaded openings 24 may be provided through base platform 14 to allow easy introduction of screws or other fasteners through the platform to the supporting boat deck 16.

Elements of frame 26 are attached to the ends of base platform 14. Frame 26 is constructed from a C-shaped backside brace member 28, which is turned to present its open face downwardly and which is attached at its ends to the back edge of base platform 14 by conventional means. Brace member 28 rises vertically from platform 14, standing on its ends to provide the back portion of a four leg frame. A right side frame rail 30 and a left side frame rail 32 are attached at their lower ends to a forward edge of base platform 14. Both frame rails 30 and 32 rise upwardly from the base platform 14, turning toward the backside brace member 28 to which they are attached at their second ends. Brace member 28 and frame rails 30 and 32 provide four vertical columns rising from adjacent the corners of base platform 14 with the side frame rails 30 and 32 being braced against backside brace member 28 and the backside brace member being formed of a self reinforcing cross member which completes the back, closed face of the C.

A second, upper member 34, having a rectangular shape is supported between the four corners of frame 28 defined by upwardly oriented legs of frame 28 prove by backside brace 28 and side frame rails 30 and 32. Upper member 34 provides a second point of support for poles 14, spaced from the base platform 14 sufficiently to stabilize the poles. Upper member 34 is positioned parallel to and above, but aligned with base platform 14. A plurality of notches 36 are formed or cut into a forward, major edge of member 36 to be open toward the front (i.e. Away from the cross member section of backside brace 28) of storage rack 10. Each notch 36 is vertically aligned with one of openings 22 to provide two points of support for a pole 12. An elastic, weather resistant material 38 fills each notch 36. The elastic material 38 in each notch 36 includes a slit 40 also open toward the forward edge of member 34. A pole 12 thus may be introduced to a slit 40 which grips the pole preventing its easy displacement and withdrawal of the pole from storage rack 10 directly upwardly.

An arm 42 is positioned along the forward edge of member 34 and, in the closed position illustrated, is flush against the forward edge, horizontally closing notches 36. Arm 42 is mounted on a hinge 46 which is disposed adjacent the right side rail 30 permitting arm 42 to be swung open from member 34. When closed, arm 42 may be secured to with side rail 32 or member 34 adjacent side rail 32 by a lock 44. The details of construction of lock 44 are conventional and are omitted here for the sake of simplicity. Typically lock 44 will be key actuated.

Figure 4:
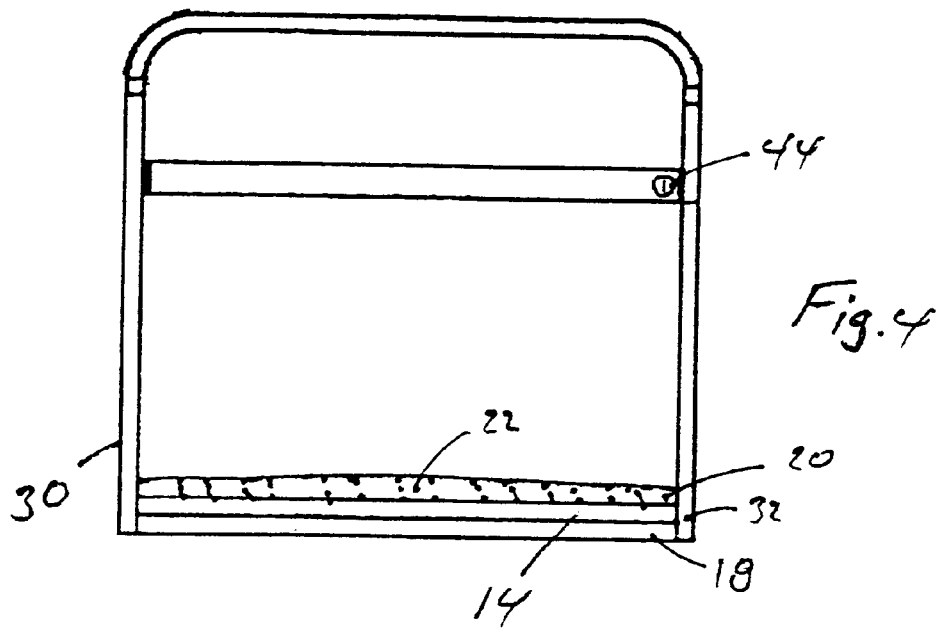
FIG. 4 is a front elevation of the fishing rod rack.
Figure 5:
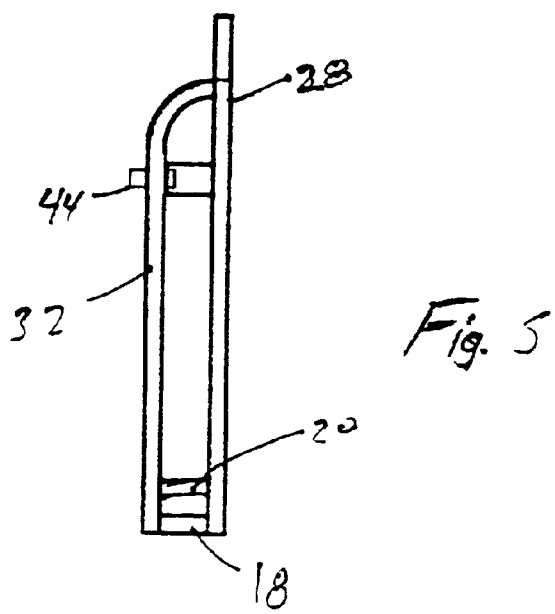
FIG. 5 is a side elevation of the fishing rod rack.

As may be seen in FIGS. 4 and 5, the base layer 18 and upper layer 20 of base platform 14 may be mutually spaced a small distance. Butt ends of poles 14 pass through holes 22 to rest on the base layer 18.

FIG. 6 illustrates rack 10 with arm 42 swung open.

The storage rack of the present invention provides for the secure, upright stowage of fishing rods on boats. The arrangement saves on limited deck space, and helps keep poles and equipment organized and available for retrieval. The system also provides for securing poles against easy dislodgement due to rough seas or to the unintended contact with the occupants of the boat. Where the boat is an open boat, a lock feature of the storage system secures the rods against easy theft.

While the invention shown in only one of its forms, it is no s limited but is susceptible to various changes and modifications without departing from the spirit and scope of the invention.

What is claimed is:

1. A fishing rod rack comprising:
   a horizontally disposed base member having a bottom major surface adapted for flush mounting on a boat deck and an upper major surface;
   a plurality of receptacles into the upper major surface of the base member for receiving butt ends of fishing poles;
   a horizontally disposed upper member positioned above the base member having a plurality of recesses along a major horizontal edge, each recess being substantially aligned with one of the receptacles of the base member, each recess being filled with an elastic material;
   a slit in the elastic material filling each recess, open toward the major horizontal edge to allow insertion of the shaft of a fishing pole therein; and
   a closure horizontally aligned with the upper member and hinged along one end of the major edge to close flush against the major edge for retaining poles positioned in the fishing rod rack against removal.

2. A fishing rod rack as claimed in claim 1, further comprising a frame supporting the base and upper members.

3. A fishing rod rack as claimed in claim 2, further comprising a lock for securing the closure against the major edge.

4. A fishing rod rack as claimed in claim 3, wherein the base member comprises a lower layer and an upper layer, the receptacles being formed by holes running through the upper layer from top to bottom.

5. A fishing rod rack as claimed in claim 4, wherein the frame comprises metal tubing.

6. A storage system for narrow elongated articles, comprising:
   a base, horizontal platform having an upper surface;
   a frame extending upwardly from the base, horizontal platform;
   a rectangular member supported on the frame above and parallel to the base, horizontal platform;
   a plurality of cavities formed in the upper surface of the base, horizontal platform for receiving ends of the narrow elongated articles;
   a plurality of notches along a major edge of the rectangular member each being vertically aligned with one of the plurality of cavities; and
   an arm pivotally attached with respect to the rectangular member to close and open along the major edge of the rectangular member including the plurality of notches.

7. A storage system as claimed in claim 6, further comprising:
   a lock for securing the arm against the major edge.

8. A storage system as claimed in claim 7, further comprising:
   the base, horizontal platform having a lower surface shaped to fit flush to a boat deck.

* * * * *